(12) United States Patent
Andry et al.

(10) Patent No.: US 12,506,137 B2
(45) Date of Patent: Dec. 23, 2025

(54) HIGH CAPACITY COMPACT LITHIUM THIN FILM BATTERY

(71) Applicant: INTERNATIONAL BUSINESS MACHINES CORPORATION, Armonk, NY (US)

(72) Inventors: Paul S. Andry, Yorktown Heights, NY (US); Eric Peter Lewandowski, White Plains, NY (US); Dana Alexa Totir, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 16/578,461

(22) Filed: Sep. 23, 2019

(65) Prior Publication Data

US 2021/0091372 A1    Mar. 25, 2021

(51) Int. Cl.
*H01M 4/76* (2006.01)
*H01M 4/04* (2006.01)
(Continued)

(52) U.S. Cl.
CPC ......... *H01M 4/139* (2013.01); *H01M 4/0426* (2013.01); *H01M 4/043* (2013.01);
(Continued)

(58) Field of Classification Search
CPC .... H01M 4/667; H01M 4/76; H01M 10/0585; H01M 4/043; H01M 10/0436;
(Continued)

(56) References Cited

U.S. PATENT DOCUMENTS

| 4,900,588 A | * | 2/1990 | Tajima | H01M 4/96 427/249.1 |
| 5,616,366 A | * | 4/1997 | Olsen | H01M 4/0409 427/508 |

(Continued)

FOREIGN PATENT DOCUMENTS

| CN | 104134816 A | 11/2014 | |
| CN | 207558947 U | * 6/2018 | ............. Y02E 60/10 |

(Continued)

OTHER PUBLICATIONS

Jelle Smekens, Rahul Gopalakrishnan, Nils Van den Steen, Noshin Omar, Omar Hegazy, Annick Hubin and Joeri Van Mierlo; Vrije Universiteit Brussel (VUB); "Influence of Electrode Density on the Performance of Li-Ion Batteries: Experimental and Simulation Results"; Energies, 9, 104; Feb. 12, 2016 (Year: 2016).*

(Continued)

*Primary Examiner* — Jessie Walls-Murray
(74) *Attorney, Agent, or Firm* — Gavin Giraud

(57) ABSTRACT

A method of forming a thin film battery may include forming may include forming a trench in a substrate, depositing a stencil on top surface of the substrate, wherein the stencil is aligned with the trench, depositing a cathode layer in the trench, wherein the cathode layer is in direct contact with the stencil, and compressing the cathode layer into the trench to reduce a thickness of the cathode layer. The compressing the cathode layer into the trench may include applying isostatic pressure onto the cathode layer using a pressure head. The method may also include depositing an electrolyte layer on top of the cathode layer, depositing an anode layer on top of the electrolyte layer, and depositing an anode collector layer on top of the anode layer.

9 Claims, 6 Drawing Sheets

(51) Int. Cl.
  *H01M 4/139* (2010.01)
  *H01M 4/66* (2006.01)
  *H01M 10/02* (2006.01)
  *H01M 10/04* (2006.01)
  *H01M 10/052* (2010.01)
  *H01M 10/0585* (2010.01)

(52) U.S. Cl.
  CPC ............. *H01M 4/667* (2013.01); *H01M 4/76* (2013.01); *H01M 10/02* (2013.01); *H01M 10/0436* (2013.01); *H01M 10/052* (2013.01); *H01M 10/0585* (2013.01); *H01M 2220/30* (2013.01)

(58) Field of Classification Search
  CPC ............... H01M 2220/30; H01M 6/40; H01M 2010/0495; H01M 10/465; H01M 4/0421; H01M 4/0423; H01M 4/0402; H01M 10/4257; H01M 2008/1293; H01M 4/0426; H01M 8/1286; H01M 8/0236; H01M 4/8896; H01L 31/04–046
  See application file for complete search history.

(56) References Cited

U.S. PATENT DOCUMENTS

| | | | | |
|---|---|---|---|---|
| 6,495,283 | B1* | 12/2002 | Yoon | H01M 6/18 29/623.5 |
| 6,982,132 | B1* | 1/2006 | Goldner | H01M 10/0585 29/623.5 |
| 8,039,314 | B2* | 10/2011 | DeGraw | H01L 21/76898 438/114 |
| 8,404,376 | B2* | 3/2013 | Snyder | H01M 50/50 429/129 |
| 8,628,645 | B2 | 1/2014 | Wang | |
| 8,864,954 | B2 | 10/2014 | Nieh | |
| 8,870,979 | B2* | 10/2014 | Bouillon | H01M 50/116 29/623.5 |
| 8,951,828 | B1* | 2/2015 | Lai | H10K 10/82 438/82 |
| 9,184,435 | B2 | 11/2015 | Hosoe | |
| 9,324,992 | B2 | 4/2016 | Gennett | |
| 9,368,849 | B2 | 6/2016 | Iisaka | |
| 2001/0033952 | A1* | 10/2001 | Jenson | H01M 10/4264 429/162 |
| 2003/0118897 | A1* | 6/2003 | Mino | H01L 23/58 429/149 |
| 2004/0029311 | A1* | 2/2004 | Snyder | H01L 24/01 438/106 |
| 2007/0007239 | A1* | 1/2007 | Lee | H01M 4/0421 216/75 |
| 2007/0158200 | A1* | 7/2007 | Cohen | C25D 5/00 427/457 |
| 2008/0318129 | A1* | 12/2008 | Lewis | H01M 4/9033 264/319 |
| 2011/0076568 | A1* | 3/2011 | Bouillon | H01M 10/0525 429/246 |
| 2012/0052382 | A1* | 3/2012 | Yoshida | H01M 4/139 429/211 |
| 2013/0260183 | A1* | 10/2013 | Ellis-Monaghan | H01M 10/0525 429/7 |
| 2014/0099556 | A1* | 4/2014 | Johnson | H01M 10/0436 156/244.11 |
| 2015/0084157 | A1* | 3/2015 | Tegen | H01M 10/4257 257/528 |
| 2015/0280198 | A1* | 10/2015 | Weis | H01M 4/583 429/147 |
| 2015/0340727 | A1* | 11/2015 | Iwamoto | H01M 10/0585 429/126 |
| 2016/0064785 | A1 | 3/2016 | Kim | |
| 2016/0308173 | A1 | 10/2016 | Neudecker | |
| 2017/0092566 | A1* | 3/2017 | Biederman | H01L 23/58 |
| 2017/0365853 | A1 | 12/2017 | Visco | |
| 2018/0082959 | A1* | 3/2018 | Gelorme | H01L 24/83 |
| 2018/0175428 | A1 | 6/2018 | Chiang | |

FOREIGN PATENT DOCUMENTS

| | | | | |
|---|---|---|---|---|
| CN | 109818047 | A | 5/2019 | |
| CN | 114424377 | A | 4/2022 | |
| DE | 112020003670 | T5 | 6/2022 | |
| EP | 3174129 | B1 | 4/2019 | |
| GB | 2602607 | A | 7/2022 | |
| JP | 2017-103222 | A | 6/2017 | |
| JP | 7563854 | B2 | 10/2024 | |
| WO | 02/65573 | A1 | 8/2002 | |
| WO | 20070449042 | A2 | 4/2007 | |
| WO | WO-2021059045 | A1 * | 4/2021 | ............ H01M 10/02 |

OTHER PUBLICATIONS

Cao et al., "A quasi-solid-state Li—S battery with high energy density, superior stability and safety", J. Mater. Chem. A, 2019, 7, 6533-6542; MIIT Key Laboratory of Critical Materials Technology for New Energy Conversion and Storage, China, <https://doi.org/10.1039/C9TA00146H> (Year: 2019).*

DiMaria et al., "A Permeable-Base Switching Device Using Stacked Layers of Silicon, Silicon Dioxide, and Silicon-Rich Silicon Dioxide", IEEE Transactions on Electron Devices, vol. ED-34, No. 8, Aug. 1987, pp. 1762-1767 (Year: 1987).*

Yang et al, "A Rigorous Model for Through-Silicon Vias With Ohmic Contact in Silicon Interposer", IEEE Microwave and Wireless Components Letters, vol. 23, No. 8, Aug. 2013, pp. 385-387 (Year: 2013).*

"Degenerately Doped Silicon Wafers", Degenerately Doped Substrates | UniversityWafer, Inc., <https://www.universitywafer.com/degenerately-doped.html> (Year: 2017).*

Notification of Transmittal of the International Search Report and Written Opinion of the International Searching Authority, or the Declaration, International application No. PCT/IB2020/057793, Applicant's or agent's file reference P201704442, Date of Mailing Dec. 2, 2020, 10 pages.

Qu et al., "Thin Flexible Lithium Ion Battery Featuring Graphite Paper Based Current Collectors with Enhanced Conductivity", (Submitted on Nov. 12, 2015), Abstract, 17 pages.

Dudney et al., "Analysis of thin-film lithium batteries with cathodes of 50 nm to 4 um thick LiCoO2", (English) Journal of Power Sources; vol. 119-121; 300-304, Elsevier Science B.V., 2003, 19 pages, Tib, Leibniz Information Centre for Science and Technology University Library.

Research and Markets the World's Largest Market Research Store, "Thin Film and Printed Battery Market—Global Forecast to 2022", Accessed on Jun. 10, 2019, 10 pages.

"International Search Report and Written Opinion", International Application No. 202080065460.6, Filed, Aug. 19, 2020, 16 pages.

* cited by examiner

HIGH CAPACITY COMPACT LITHIUM THIN FILM BATTERY

BACKGROUND

The present invention relates generally to a thin film battery, and more particularly, to a method and structure for forming a high capacity compact lithium thin film battery.

A typical thin film lithium battery includes different layers of materials, including, but not limited to, a cathode, a separator and an anode. Capacity of such a battery is generally limited by the cathode layer thickness and structure. As such, a thick cathode layer may translate to a battery with high capacity whereas a thin cathode layer may translate to a battery with low capacity. Further, the layers are deposited using thin film vacuum deposition techniques, such as sputtering or plasma-enhanced chemical vapor deposition.

SUMMARY

According to one embodiment of the present invention, a method of forming a thin film battery is provided. The method may include forming a trench in a substrate, depositing a stencil on top surface of the substrate, wherein the stencil is aligned with the trench, depositing a cathode layer in the trench, wherein the cathode layer is in direct contact with the stencil, and compressing the cathode layer into the trench to reduce a thickness of the cathode layer. The compressing the cathode layer into the trench may include applying isostatic pressure onto the cathode layer using a pressure head. The stencil may be made of a high temperature polymer or a low temperature polymer. The method may include depositing a cathode collector layer along sidewalls and bottom of the trench, depositing a cathode layer in the trench, and compressing the cathode layer into the trench to reduce a thickness of the cathode layer. The method may also include depositing an electrolyte layer on top of the cathode layer, depositing an anode layer on top of the electrolyte layer, and depositing an anode collector layer on top of the anode layer.

According to another embodiment of the present invention, a method of forming a plurality of thin film batteries is provided. The method may include forming a plurality of trenches in a substrate, forming a plurality of dicing channels in the substrate, wherein each of the plurality of dicing channels is between each of the plurality of trenches, depositing a stencil on top surface of the substrate, wherein the stencil is aligned with the trench, depositing a cathode layer in the plurality of trenches, wherein the cathode layer is in direct contact with the stencil, and compressing the cathode layer into the plurality of trenches to reduce a thickness of the cathode layer.

According to another embodiment of the present invention, a structure is provided. The structure may include a cathode collector layer positioned along a substrate and a cathode layer buried in the substrate, wherein a top surface of the cathode layer is substantially flush with a top surface of the cathode collector layer. The structure may include an anode layer positioned on top of an electrolyte layer, wherein the electrolyte layer separates the cathode layer from the anode layer, an anode collector layer positioned on top of the anode layer, and an insulator layer positioned on top of the anode collector layer.

BRIEF DESCRIPTION OF THE DRAWINGS

The following detailed description, given by way of example and not intend to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
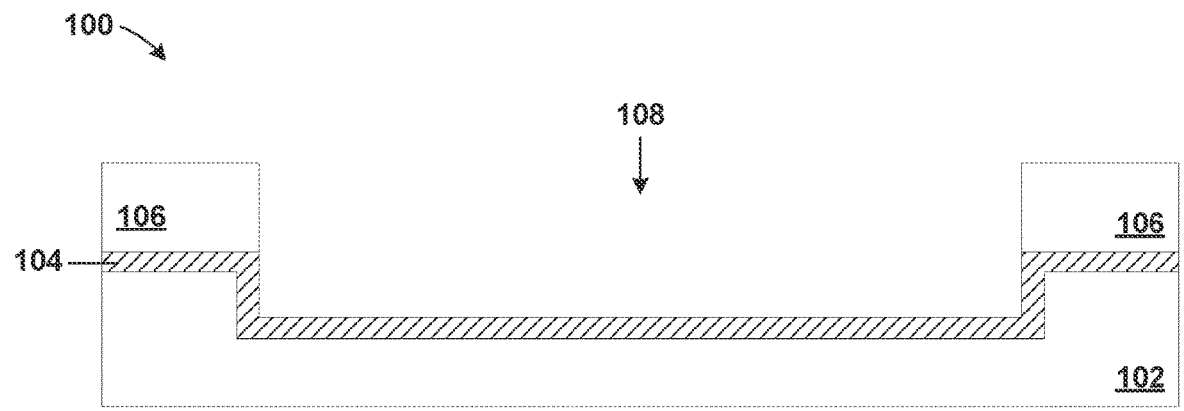
FIG. 1 is a cross section view illustrating a trench created in a substrate according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiment set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention generally relate to a high capacity compact lithium thin film battery, and more particularly, to a structure and method of forming a high capacity lithium thin film battery with a small seal surface area.

Typically, a thin film lithium battery is made of different materials, where each material is layered on top of one another. Such layers may include, but are not limited to, a cathode collector layer, a cathode layer, an electrolyte layer, an anode layer, an anode collector layer, and an insulating layer. Further, the capacity of a conventional thin film lithium battery is generally limited by the cathode layer thickness and structure. As such, a thick cathode layer may translate to a battery with high capacity whereas a thin cathode layer may translate to a battery with low capacity.

Generally, these layers are deposited using different vacuum deposition techniques, such as sputtering. However, these vacuum deposition techniques are limited by their deposition rates. As such, using the sputtering deposition technique to produce a thin film lithium battery is time-consuming and expensive. It is even more time-consuming and expensive when producing high capacity batteries because such a battery requires a thick cathode layer translating to an even longer sputtering time to deposit such a thick cathode. In addition, since lithium is highly reactive, such a battery requires a large seal to protect the lithium layer from pollutants such as water or oxygen. As a result, the battery that is produced is also physically large, with surface areas between 10 mm$^2$ to 1000 mm$^2$, where the surface area of the seal itself is at least 1 mm$^2$.

As technology advances, new emerging Internet of Things sensors and smart devices may require batteries with surface areas smaller than 10 mm$^2$ to power these sensors and smart devices. Accordingly, there exists a need to develop a thin film lithium battery that has high capacity and has a total surface area, including the seal, that is less than 10 mm$^2$, preferably about 1 mm$^2$. In addition, there exists a need to bring the processing cost down to a level far below what can be achieved using current thin film techniques. As such, embodiments of the present invention provide a structure and a method of producing a high capacity battery, with a total surface area that is less than 10 mm$^2$, while reducing processing time and cost.

Referring now to FIG. 1, a structure 100 is shown, in accordance with an embodiment. The structure 100 may include a substrate 102, a cathode collector layer 104, a stencil 106, and a trench 108. The substrate 102 may include a silicon-based material. Illustrative examples of silicon-based materials suitable for the substrate 102 may include, but are not limited to, silicon, silicon, silicon-germanium, silicon-germanium-carbon, silicon-carbon, and multi-layers thereof. In an embodiment, the substrate 102 may be a degenerately doped silicon allowing for back side electrode contact.

The substrate 102 may be patterned, using known lithography techniques, to create the trench 108. The substrate 102 may also be etched to create the trench 108. For example, reactive ion etching may be used to etch the trench 108 in the substrate 102. Once the trench 108 is created, the cathode collector layer 104 is conformally deposited on the top surface of the substrate 102 and along the sidewalls and bottom of the trench 108. The cathode collector layer 104 may be deposited using different deposition processes such as, for example, evaporation, chemical vapor deposition, atomic layer deposition, sputtering, or other suitable deposition processes.

The cathode collector layer 104 may be made of a non-reactive metal such as, for example, copper, silver, gold, platinum, or any other suitable non-reactive metal. The cathode collector layer 104 is electrically conductive and acts as a barrier. In addition to providing a current path to a cathode (110), the cathode collector layer 104 may prevent impurities, found in the substrate 102 and the environment, from getting into other layers that may be deposited on top of the top surface of the cathode collector layer 104.

The stencil 106 is deposited, using known suitable deposition techniques described herein above, on the top surfaces of the cathode collector layer 104. In an embodiment, the stencil 106 is deposited on the top surface of the cathode collector layer 104 and onto the sidewalls and the bottom of the trench 108. Once the stencil 106 is deposited, the stencil 106 may be patterned, using known techniques, to remove the stencil 106 that was previously deposited in the trench 108. As a result, the trench 108 is lined with the cathode collector layer 104 and does not have any stencil 106 in it. The stencil 106 only remains on the top surface of the cathode collector layer 104 which is on top of the top surface of the substrate 102.

The stencil 106 further defines the trench 108 patterned in the substrate 102. The stencil 106 extends the sidewalls of the trench 108 above the top surface of the cathode collector layer 104 and the substrate 102 because the stencil 106 only remains on the top surface of the cathode collector layer 104. As a result, sidewalls of the stencil 106 that are closest to the trench 108 are substantially aligned with the sidewalls of the trench 108. The stencil 106 also protects the cathode collector layer 104 from deteriorating during subsequent processing steps of battery manufacture.

The stencil 106 is also removable and may be made from different polymers. For example, if a low temperature pressing step is subsequently used to form a cathode layer, then the stencil 106 is made of a high temperature compressible polymer. However, if a high temperature pressing step is subsequently used to form a cathode layer, then the stencil is made of a low temperature polymer.

Figure 2:
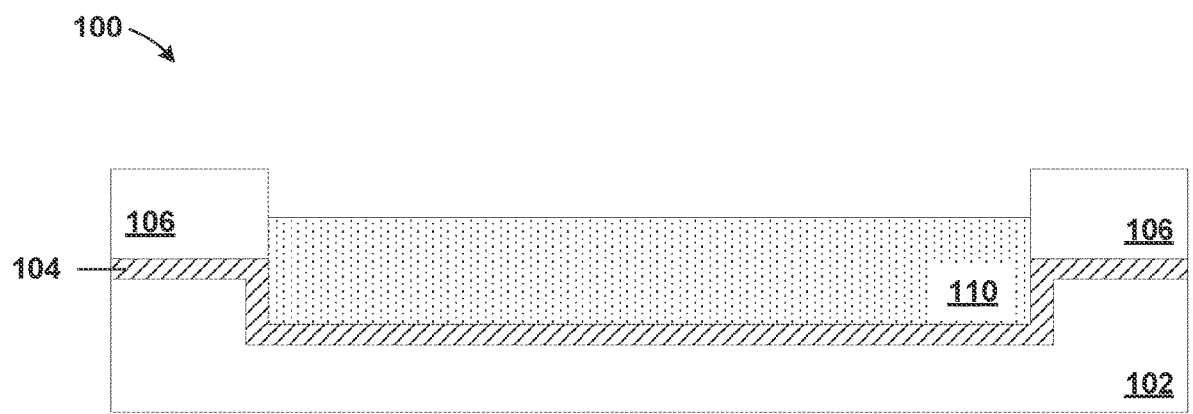
FIG. 2 is a cross section view illustrating a deposited cathode according to an exemplary embodiment.

Referring now to FIG. 2, after the stencil 106 is deposited on the top surfaces of the cathode collector layer 104, a cathode layer 110 is deposited into the trench 108. The cathode layer 110 may be made of lithium containing material, such as, for example, $LiCO_2$, $LiMn_2O_4$, $LiFePO_4$ or other suitable cathode material (e.g., metal oxides). Once deposited, the cathode layer 110 extends above the top surface of the cathode collector layer 104 but below the top surface of the stencil 106. As such, the cathode layer 110 is contained in the trench 108, within the sidewalls created by the stencil 106, and is in direct contact with portions of the sidewalls of the stencil 106. In an embodiment, the cathode layer 110 extends above the top surface of the cathode collector layer 104 such that the after further processing, described herein with reference to FIGS. 3-4, the cathode collector layer 104 may be substantially flush with the top surface of the cathode collector layer 104 that extends along the top surface of the substrate 102, accounting for the initial density of the cathode layer 110 and the final desired density of the cathode layer 110.

Figure 3:
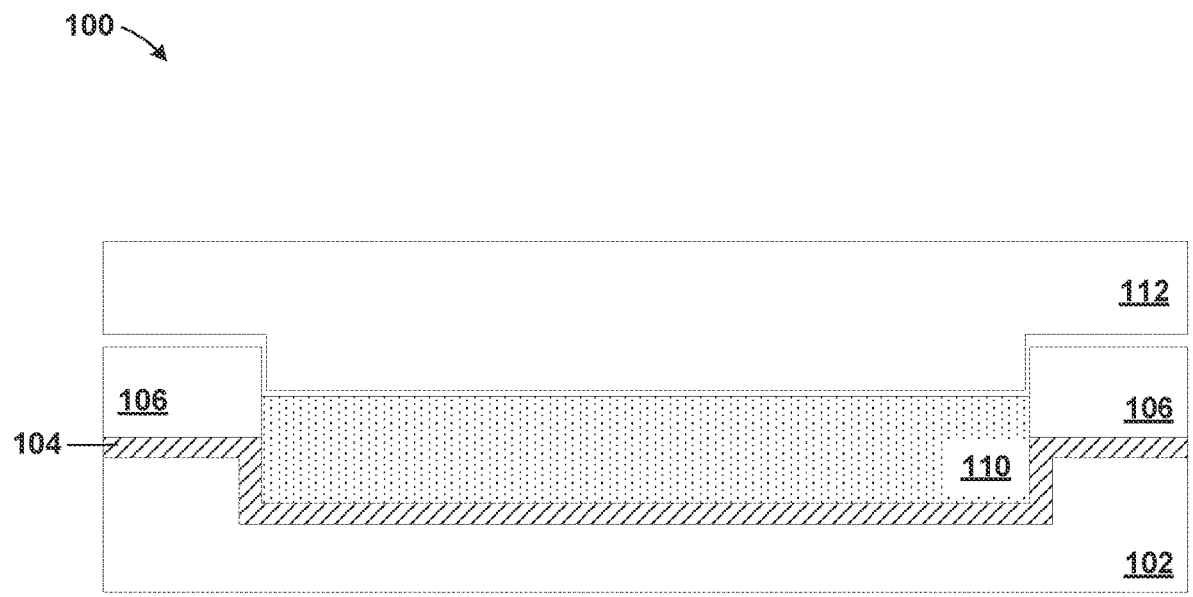
FIG. 3 is a cross section view illustrating an aligned pressure head on top of the cathode according to an exemplary embodiment.

Referring now to FIG. 3, a pressure head 112 is positioned directly above the cathode layer 110. The pressure head 112 may be made of the same material as the substrate 102 such as, for example, silicon, or any other suitable material. The positioning of the pressure head 112 is aided by the sidewalls of the stencil 106 which extend above the top surface of the cathode layer 110. As a result, the pressure head 112 fits between the area created by the stencil 106, directly above cathode layer 110.

Once the pressure head 112 is in position, the pressure head 112 is used to isostatically press the cathode layer 110 down into the trench that was patterned in the substrate 102. When the cathode layer 110 is first deposited into the trench 108, the cathode layer 110 fills the trench 108 and extends above the top surface of the cathode collector layer 104 but below the top surface of the stencil 106. As a result, more cathode layer 110 is deposited than necessary to just fill the trench 108. This is done so that the cathode layer 110 may be pressed down into the trench that was patterned in the substrate 102, reducing its thickness.

The isostatic pressing of the cathode layer 110 may be done either under low or high temperature. In an embodiment, the cathode layer 110 may be isostatically compressed, or compacted, at a low temperature that is compatible with the stencil 106. Once the cathode layer 110 is compressed, the stencil 106 may be removed and the cathode layer 110 may be further compressed and heated. During the isostatic pressing, the pressure head 112 applies equal pressure in all directions and pushes down onto the cathode layer 110 condensing the cathode layer 110.

Generally, when depositing a cathode using a deposition process such as sputtering, a mechanical polishing step may then be needed before additional layers are deposited on top of the cathode. The sputtering deposition step may introduce impurities into the cathode. Using the pressure head 112 to compress the cathode layer 110 creates a dense cathode layer 110 that is free from impurities. After it is compressed using the pressure head 112, cathode layer 110 has a clean interface that may be subsequently patterned and sealed.

In addition, unlike with conventional sputtering deposition processes, compressing the cathode layer 110, using the pressure head 112, allows for the porosity of the cathode layer 110 to be controlled. The porosity of the cathode layer 110 may be controlled by the properties of cathode layer 110 that is deposited. For example, the properties of the cathode layer 110 may refer to the shape of the particles that make up the cathode layer 110.

The porosity of the cathode layer 110 may also be controlled by the amount of pressure applied to the cathode layer 110 by the pressure head 112. For example, the same thickness of the cathode layer 110 is deposited in both scenarios. If, in the first scenario, more pressure is exerted by the pressure head 112 onto the cathode layer 110, the cathode layer 110 may be more densely compacted. However, if in the second scenario, less pressure is exerted by the pressure head 112, the cathode layer 110 may be compacted but it will be less dense and more porous.

The porosity of the cathode layer 110 may be controlled by the duration of the compression of the cathode layer 110. For example, the duration of the compression of the cathode layer 110 by the pressure head 112 may yield different densities of the cathode layer 110. For example, the same thickness of the cathode layer 110 is deposited. If the duration of the compression is short, the cathode layer 110 may be less dense when compared to the density of the cathode layer 110 when the duration of the compression is longer.

The porosity of the cathode layer 110 may also be controlled by the temperature under which the cathode layer 110 is compressed. Under the process of sintering, the cathode layer 110 may be compressed. This causes the particles that make up the cathode layer 110 to adhere to each other and combine, forming a less porous cathode layer 110 than the cathode layer 110 that is first deposited into the trench (108).

In addition, the cathode layer 110 may be combined with additives to increase the battery's efficiency. In an embodiment, the cathode layer 110 may be combined with a low vapor pressure ionic liquid electrolyte to increase the performance of the cathode layer 110. In another embodiment, the cathode layer 110 may be combined with conductive carbon, which may also increase the performance of the cathode layer 110 by increasing its electronic conductivity. In an embodiment, if hot pressing is used to compress the cathode layer 110, then the ionic liquid electrolyte may be added to the cathode layer 110 by flowing the ionic liquid electrolyte into the compressed cathode layer 110 via capillary forces. In an alternative embodiment, if cold pressing is used to compress the cathode layer 110, then the ionic liquid electrolyte may be incorporated into the cathode layer 110 before the cathode layer is compressed with the pressure head 112.

Figure 4:
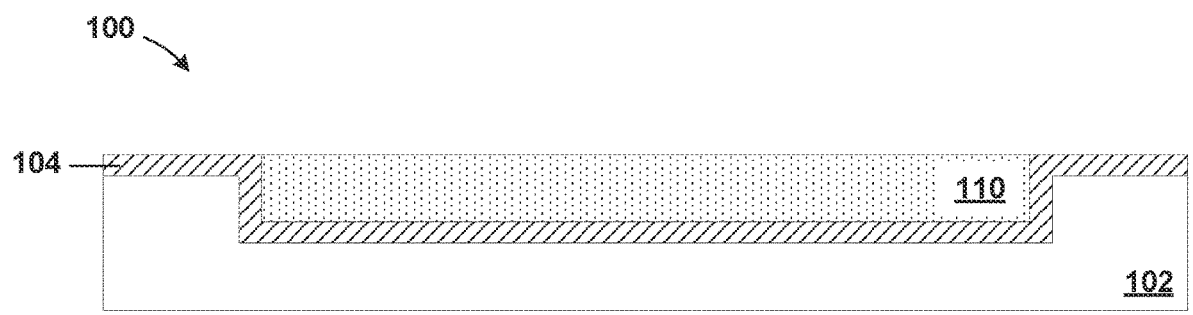
FIG. 4 is a cross section view illustrating a polished cathode layer according to an exemplary embodiment.

Referring now to FIG. 4, the cathode layer 110 is compressed such that the top surface of the cathode layer 110 is substantially flush with the top surface of the cathode collector layer 104 that extends along the top surface of the substrate 102. To ensure this enough cathode layer 110 is deposited such that when compressed by the pressure head 112, the cathode layer 110 is substantially flush with the top surface of the cathode collector layer 104. Generally, when manufacturing a lithium battery, the cathode layer is deposited on top of the cathode collector layer 104 using a deposition process, such as, for example sputtering. As described herein above, the thicker the cathode layer 110, the higher the capacity of the battery. Therefore, it is advantageous to produce a battery with a thick cathode layer 110. However, conventional deposition processes are time consuming and expensive. Utilizing the pressure head 112 to hot or cold press the cathode layer 110 into the trench 108 (FIG. 1) creates a cathode layer 110 of a desired thickness and density than if deposited using conventional techniques, further increasing the capacity of the battery.

Burying the cathode layer 110 in the substrate 102 also decreases the seal area of the battery. As described herein above, when manufacturing a conventional battery, the cathode layer is deposited on top of the cathode collector layer, and the cathode collector layer is deposited on top of the substrate. As a result, a conventional battery has a stack-up of layers that need to be sealed. The seal needs to be thicker to accommodate the cathode topography. This in turn requires a larger seal area. Further, in order to produce a high efficiency battery, the thickness of the cathode layer increases. This translates to an even largerer seal area because the additional stack of layers is even higher. With a higher stack of layers, the seal area increases in order to protect the layers from environmental sources of pollution.

In an embodiment, the cathode layer 110 no longer sits on the top surface of the substrate 102. Rather, the cathode layer 110 is buried in the substrate 102, and the top surface of the cathode layer 110 is substantially flush, with the top surface of the cathode collector layer 104. Since the cathode layer 110 is no longer deposited on top of the substrate 102, the additional stack of layers is not as tall as the stack of layers when manufacturing conventional batteries where the cathode layer is deposited on top of the substrate. The shorter stack of layers translates to a smaller seal area. In addition, manufacturing the battery with a thicker cathode layer 110 does not increase the height of the stack because the cathode layer 110 may be further buried in the substrate 102 such that the cathode layer 110 does not extend above the top surface of the cathode collector layer 104.

In an embodiment, once the cathode layer 110 is isostatically compressed, a surface planarization treatment may be used to smooth the top surface of the cathode layer 110 and prepare it for further processing.

Figure 5A:
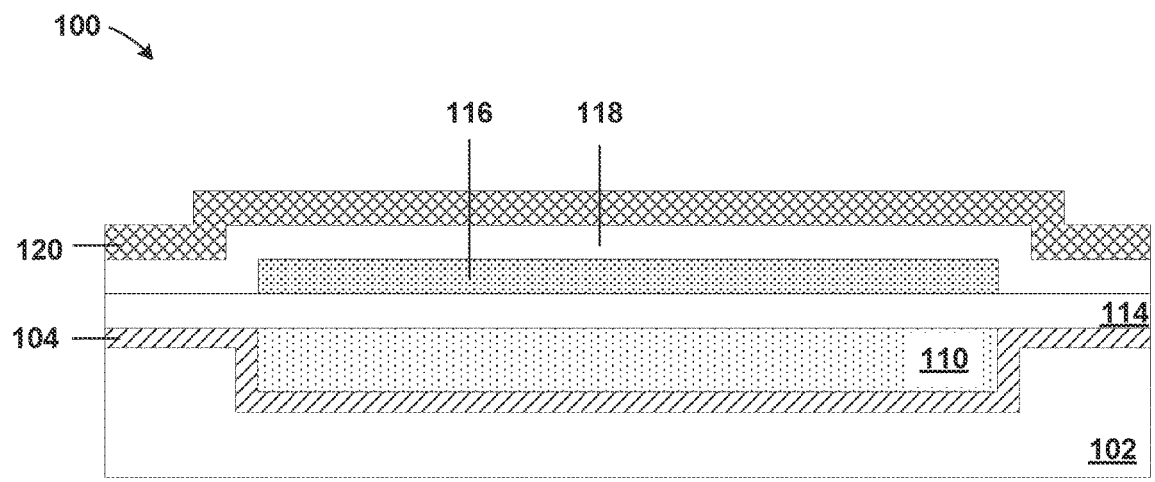
FIGS. 5A and 5B are cross section views illustrating depositing of additional layers on top of the polished cathode layer according to an exemplary embodiments.

Referring now to FIG. 5A, once the cathode layer 110 is compressed, additional layers are deposited on to the top surfaces of the cathode layer 110 and the cathode collector layer 104. The deposition of additional layers may be achieved using standard techniques. Additional layers may include, but are not limited to, an electrolyte layer 114, an anode layer 116, an anode collector layer 118, and an insulator layer 120.

The electrolyte layer 114 may include a solid-state electrolyte to provide in-situ processing with no air break. In an embodiment, the electrolyte layer 114 may include a thin solid film, such as, for example, LiPON, or a spin-applied solgel, although other materials may also be employed. The electrolyte layer may be deposited by evaporation, chemical vapor deposition, sputtering or other suitable deposition process. The electrolyte layer 114 may be deposited on the top surface of the cathode layer 110, between the cathode layer 110 and the anode layer 116, separating layers 110 and 116. The electrolyte layer 114 may provide ion conduction between the cathode layer 110 and the anode layer 116.

The anode layer 116 may be deposited on the top surface of the electrolyte layer 114. The anode layer 116 may be made of lithium, a lithium alloy, or any other suitable material. The anode layer 116 may be deposited by evaporation, chemical vapor deposition, sputtering or other suitable deposition process.

Figure 5B:
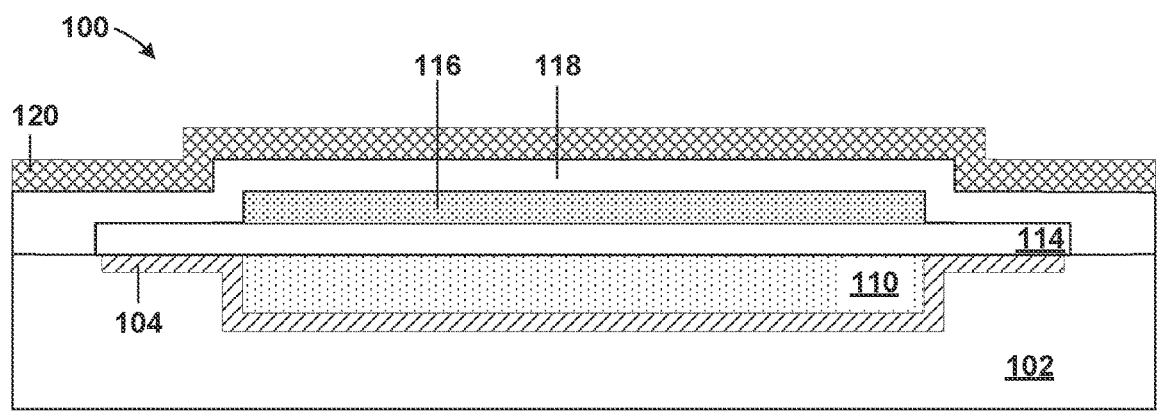

The anode collector layer 118 may be deposited on the top surface of the anode layer 116. The anode collector layer 118 serves as a current path for the anode layer 116. The anode collector layer 118 may be made of non-reactive metals such as, for example, copper, silver, gold, platinum, or any other suitable material. The anode collector layer 118 may be deposited by evaporation, chemical vapor deposition, sputtering or other suitable deposition process. In an embodiment, as depicted in FIG. 5B, the anode collector layer 118 may be in direct contact with the substrate 102 to form a seal. In an embodiment, the anode collector layer 118 and the cathode collector layer 104 both exit the seal but are not in direct contact with each other.

The insulator layer 120 may be deposited on the top surface of the anode collector layer 118. The insulator layer 120 may be made of a conductive material such as, for example aluminum, or any other suitable material. The insulator layer 120 may keep the structure 100 electrically insulated from the outside environment.

Figure 6:
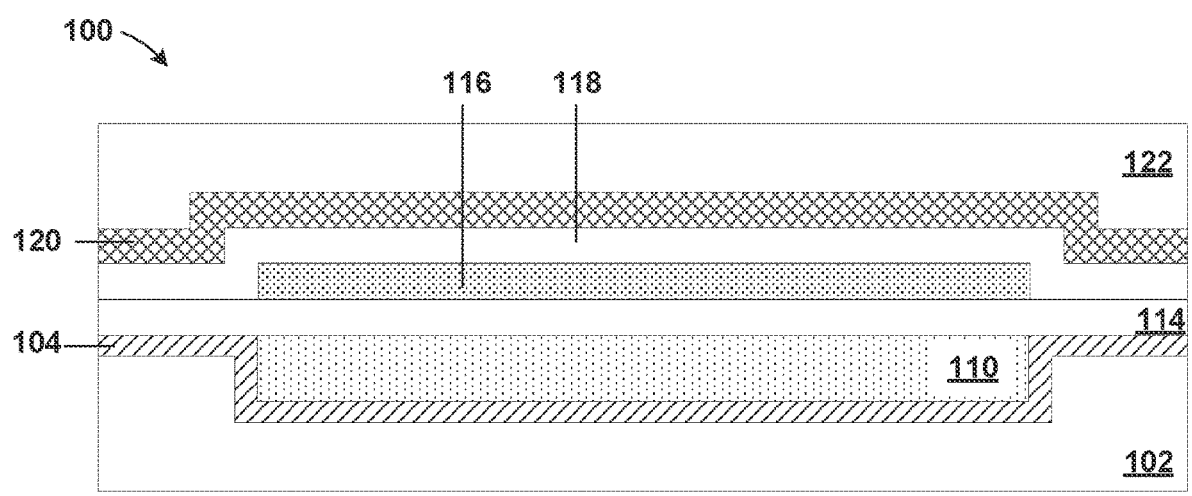
FIG. 6 is a cross section view illustrating a cover on top of the deposited layers according to an exemplary embodiment.

Referring now to FIG. 6, a cap layer 122 is deposited onto the top surface of the insulator layer 120. The cap layer 122 may be made of the same silicon-based material that makes up the substrate 102, such as, for example, silicon, silicon, silicon-germanium, silicon-germanium-carbon, silicon-carbon, and multi-layers thereof. The cap layer 122 may also be made of any combination of materials that exhibit low permeabilities to oxygen, water, and other species that detract from battery. Illustrative examples of such materials may include, but are not limited to, metal films, multi-layer metal films, insulator films, multilayer insulator films, or multilayer metal and insulator films. The cap layer 122 may be formed by chemical vapor deposition, sputtering, evaporation, or any other suitable deposition process.

The cap layer 122 covers the cathode collector layer 104, the cathode layer 110, the electrolyte layer 114, the anode layer 116, the anode collector layer 118, and the insulator layer 120. The cap layer 122 protects these layers from exposure to environmental elements, corrosion, or other damage. In an embodiment, the cap layer 122 is deposited on top of the insulator layer 120. In an alternative embodiment, the cap layer 122 is not deposited on the insulator layer 120. Rather, the insulator layer 120 is the top-most layer in the structure 100. However, having the cap layer 122 cover the other layers, including the insulator layer 120, is more beneficial because the cap layer 122 shields the structure 100 from environmental elements better than the insulator layer 120, increasing the shelf life of the structure 100.

In a conventional battery, in order to access the cathode or the anode, isolated vias are typically patterned through any insulator or separator layers. In addition, contacts are typically made on the anode side of the battery. In an embodiment, for example, the anode contact may be made by patterning an isolated via through the insulator layer 120. However, the cathode contact may be made using a conductive cathode substrate, such as, for example, a degenerately doped silicon. When a conductive cathode substrate is used, the cathode collector layer 104 may make ohmic contact with the substrate 102, allowing for the back side ohmic metal contact to be patterned. A backside contact takes up less area, when compared to the conventional anode side (or frontside) contact scheme, allowing for more area to be used for electrochemical materials.

Figure 7:
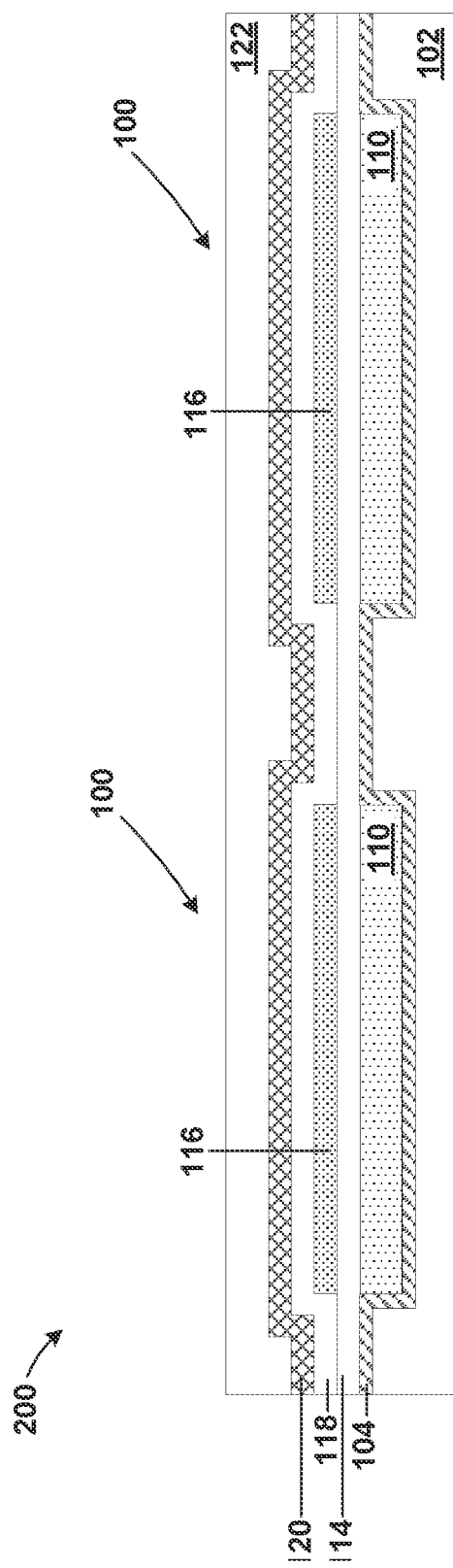
FIG. 7 is a cross section view illustrating a plurality of batteries according to an exemplary embodiment.

Referring now to FIG. 7, a structure 200 is illustrated. The structure 200 is representative of multiple structures 100, or batteries, manufactured side-by-side on a single wafer. Even though only two structures 100 are illustrated, embodiments of the invention contemplate multiple structures 100 that are manufactured, as described herein with reference to FIGS. 1-6, on a single substrate 102.

Figure 8A:
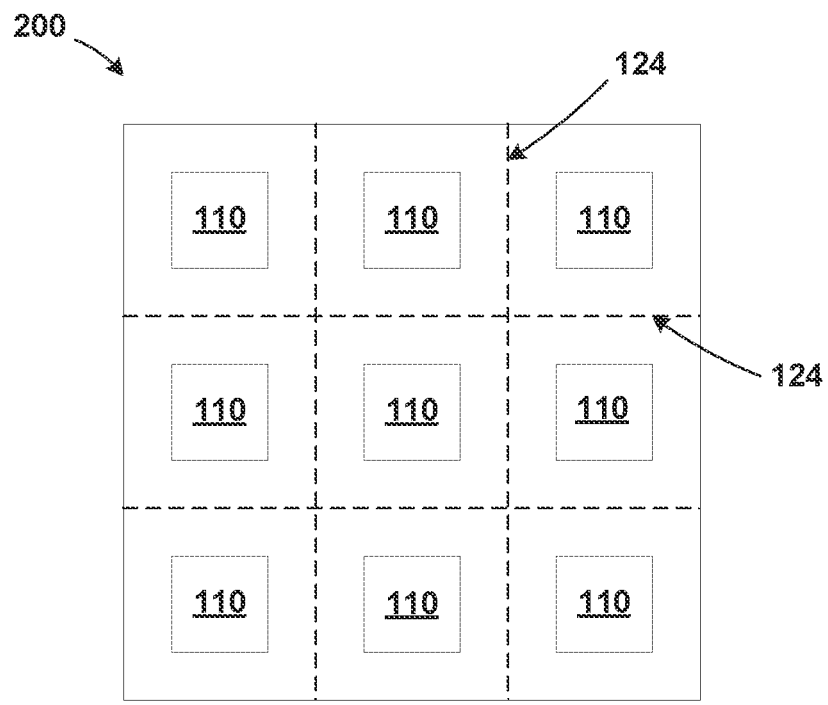
FIGS. 8A and 8B are cross section views illustrating a plurality of batteries on a substrate according to an exemplary embodiment.
Figure 8B:
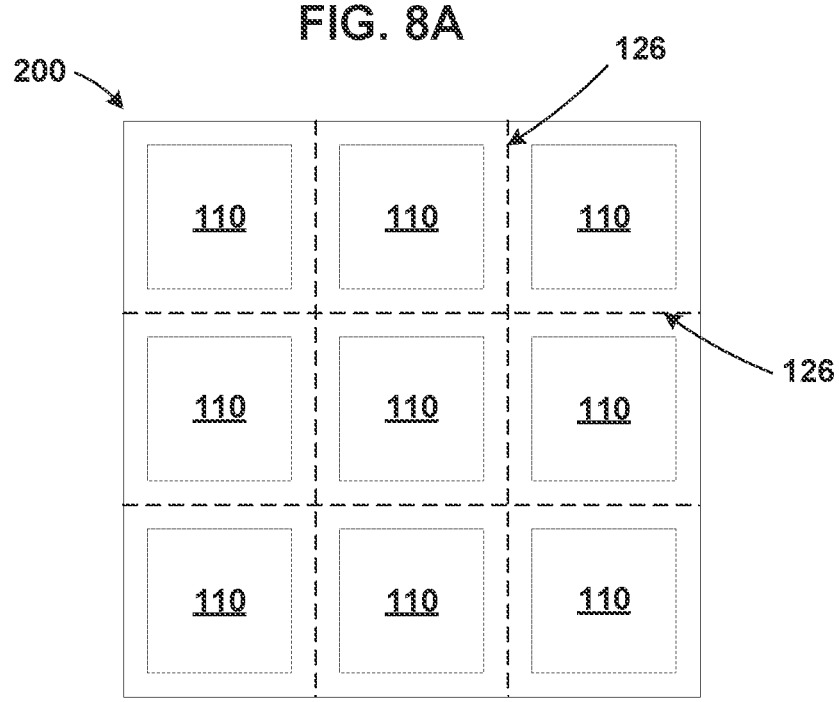

Referring now to FIGS. 8A and 8B which both illustrate the structure 200 with more than two batteries (100) FIG. A represents the structure 200 manufactured using conventional sputtering processing, and FIG. 8B represents the structure 200 manufactured in accordance with the present invention. The structure 200 may include a plurality of batteries, each of which includes a cathode layer 110. It should be noted that other components of the batteries (100) are omitted from FIGS. 8A and 8B for clarity and understanding. After forming the batteries (100), the structure 200 may be cut or diced, along lines 124, to produce multiple individual batteries. As described herein above, manufacturing of batteries, using conventional sputtering processing, generates batteries that have larger seal areas relative to areas of their cathode layers 110 due to the stack-up of layers that need to be sealed and protected from environmental pollutants. In addition, large seal areas are also needed to protect the integrity of the layers during the cutting of the structure 200 when separating into individual batteries. As such, conventional processes result in batteries that have relatively small cathode layers 110 and relatively large seal areas when compared to the batteries manufactured in accordance with the present invention.

As described herein above with reference to FIGS. 1-6, and illustrated in FIG. 8B, by burying the cathode layer 110 into the substrate 102, the cathode 110 size can be increased and the seal area can be reduced/decreased while maintaining the same dicing footprint. Since the cathode layer 110 no longer extends above the substrate 102, there is less stack-up of layer thereby reducing the seal width while maintaining functional and physical integrity of the individual battery structures (100). As a result of the decreased size of the seal area/width, the cathode layer 110 may increase (width/length), thus increasing the capacity of the battery.

In addition, during the etching of the trench in the substrate 102 (FIG. 1), dicing channels 126 may also be etched into the substrate 102 at the same time. The dicing channels 126 may be located between each structure 100 (FIG. 7) and define the edge of each structure 100. The dicing channels 126 are small channels in the substrate 102 that aide in the cutting of the substrate to form single structures 100.

Embodiments of the present invention incorporate the dicing channels 126 to reduce the stress that is applied when structure 200 is cut into individual batteries (structures 100). The dicing channels 126 allow for each battery to maintain its seal integrity. In addition, each cathode layer 110 may be made bigger because large seal areas are no longer necessary. Therefore, with the inclusion of dicing channels 126, and the burying of the cathode layer 110 into the substrate 102, embodiments of the present invention provide a battery whose ratio between its seal and the cathode layer 110 is reduced when compared to the ratio between the seal and the cathode layer of a conventional battery. As such, the total surface area of the battery is also reduced from the total surface area of a conventional battery.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A structure comprising:
    a cathode collector layer positioned along a substrate and lining a bottom and sidewalls of a trench within the substrate, wherein the substrate is a degenerately doped silicon that makes ohmic contact with the cathode collector layer and is configured to allow for a back side ohmic metal contact to be patterned;
    one or more dicing channels etched into the substrate, wherein the one or more dicing channels are configured to define an edge of the structure and to reduce stresses associated with dicing of the structure;
    a cathode layer isostatically pressed and buried within the cathode collector layer lining the trench in the substrate, combined with a liquid electrolyte additive, wherein a top surface of the cathode layer is substantially flush with a top surface of the cathode collector layer, the cathode layer has a given density and porosity based on a duration and a pressure associated with the isostatic pressing; and
    an anode collector layer in direct contact with the substrate to form a seal around the trench and around the cathode collector layer, wherein the anode collector layer is not in direct contact with the cathode collector layer.

2. The structure of claim 1 further comprising:
    an anode layer positioned on top of an electrolyte layer, wherein the electrolyte layer separates the cathode layer from the anode layer; and
    an insulator layer positioned on top of the anode collector layer.

3. The structure of claim 2, wherein the electrolyte layer provides ion conduction between the cathode layer and the anode layer.

4. The structure of claim 2, wherein the anode collector layer serves as a current path for the anode layer.

5. A structure comprising:
    a cathode collector layer positioned along a substrate and lining a bottom and sidewalls of a trench within the substrate, wherein the substrate is constructed of a degenerately doped silicon-based material that makes ohmic contact with the cathode collector layer and is configured to allow for a back side ohmic metal contact to be patterned;
    one or more dicing channels etched into the substrate, wherein the one or more dicing channels are configured to define an edge of the structure and to reduce stresses associated with dicing of the structure;
    an anode collector layer;
    a cathode layer isostatically pressed and buried within the cathode collector layer lining the trench in the substrate, combined with a liquid electrolyte additive, wherein a top surface of the cathode layer is substantially flush with a top surface of the cathode collector layer, the cathode layer has a given density and porosity based on a duration and a pressure associated with the isostatic pressing, and the anode collector layer is in direct contact with the substrate to form a seal around the trench and around the cathode collector layer, wherein the anode collector layer is not in direct contact with the cathode collector layer;
    an anode layer positioned on top of an electrolyte layer, wherein the electrolyte layer separates the cathode layer from the anode layer;
    wherein the anode collector layer is positioned on top of the anode layer; and
    a cap layer positioned on top of an insulator layer, wherein the insulator layer separates the anode collector layer from the cap layer, and wherein the cap layer is constructed of the silicon-based material.

6. The structure of claim 5, wherein the electrolyte layer provides ion conduction between the cathode layer and the anode layer.

7. The structure of claim 5, wherein the anode collector layer serves as a current path for the anode layer.

8. The structure of claim 5, wherein the cap layer covers the cathode collector layer, the cathode layer, the electrolyte layer, the anode layer, the anode collector layer, and the insulator layer, and protects these layers from exposure to environmental elements, corrosion, and other damage.

9. The structure of claim 5, wherein the electrolyte layer includes a solid-state electrolyte configured to provide in-situ processing with no air break.

* * * * *